US005631776A

United States Patent [19]

Weigand et al.

[11] Patent Number: 5,631,776
[45] Date of Patent: May 20, 1997

[54] ZOOM LENS APPARATUS AND BEARING BLOCK ASSEMBLY

[75] Inventors: John G. Weigand, Churchville; Christopher J. Kralles, Rochester; Noel L. Reyner, Hilton, all of N.Y.

[73] Assignee: Eastman Kodak Company, Rochester, N.Y.

[21] Appl. No.: 576,177

[22] Filed: Dec. 21, 1995

Related U.S. Application Data

[60] Provisional application No. 60/000,626 Jun. 30, 1995.

[51] Int. Cl.⁶ .......................... G02B 15/14; G02B 7/02
[52] U.S. Cl. ................ 359/694; 359/696; 359/703; 359/704; 359/822; 359/823; 359/826
[58] Field of Search ............................... 359/694, 696, 359/703, 704, 822, 823, 826

[56] References Cited

U.S. PATENT DOCUMENTS

| | | | |
|---|---|---|---|
| 3,832,058 | 8/1974 | Gusovius | 355/56 |
| 4,161,756 | 7/1979 | Thomas | 358/225 |
| 4,329,029 | 5/1982 | Haskell | 354/23 |
| 4,446,526 | 5/1984 | Iwanade | 364/525 |
| 4,488,804 | 12/1984 | Takagi | 355/56 |
| 4,505,579 | 3/1985 | Furuichi | 355/55 |
| 4,557,593 | 12/1985 | Iwanade | 355/57 |
| 4,585,338 | 4/1986 | Nitsch et al. | 355/56 |
| 4,948,235 | 8/1990 | Akitake | 359/700 |
| 4,974,949 | 12/1990 | Tanaka | 359/694 |
| 5,140,468 | 8/1992 | Kayanuma | 359/699 |
| 5,150,260 | 9/1992 | Chigira | 359/694 |
| 5,198,932 | 3/1993 | Takamura | 359/694 |
| 5,231,472 | 7/1993 | Kawamura et al. | 359/694 |
| 5,231,473 | 7/1993 | Kawamura | 359/696 |
| 5,241,422 | 8/1993 | Shimada et al. | 359/694 |
| 5,272,567 | 12/1993 | Inoue | 359/696 |
| 5,495,309 | 2/1996 | Shiina | 354/195.12 |

FOREIGN PATENT DOCUMENTS 2917176.4  10/1980  Germany .

Primary Examiner—Georgia Y. Epps
Assistant Examiner—Ricky Mack
Attorney, Agent, or Firm—Frank Pincelli

[57] ABSTRACT

A zoom lens apparatus having a first pair of substantially parallel guide rods. A pair of carriage assemblies are mounted to the first pair of parallel guide rods each having lens element. A pair of lead screws are provided for driving the carriage assemblies. The screws are each mounted to the apparatus by a bearing block assembly such that the longitudinal axis of the lead screw is substantially parallel to the first pair of guide rods. The bearing block constrains the movement of the first lead screw along the longitudinal axis. A zero constraint threaded drive coupling is provided with each lead screw for moving the carriage along the guide rods. A motor is provided for rotating each of the drive screws.

15 Claims, 3 Drawing Sheets

ZOOM LENS APPARATUS AND BEARING BLOCK ASSEMBLY

CROSS REFERENCE TO RELATED APPLICATION

Reference is made to and priority claimed from U.S. Provisional application Ser. No. U.S. 60/000,626, filed 30 Jun. 1995, entitled ZOOM LENS APPARATUS.

FIELD OF THE INVENTION

This invention relates to the art of electromechanical drive systems and, more particularly, to an optical zoom lens. One area of use of the invention is in a photofinishing apparatus such as a high speed photographic printer.

BACKGROUND OF THE INVENTION

There currently exists cameras that have the capability of providing more than one size format image for a single filmstrip. For example, the Kodak Cameo camera can take either standard or panoramic format size pictures as desired (often referred to as interspersed pan feature).

In order for high speed photographic printers to print developed film obtained from cameras capable of taking two or more format size images, the paper exposure zoom lens assembly on the printer must be capable of switching back and forth between magnifications for different print formats. To achieve or maintain high productivity, the lens assembly of an electromechanical drive system of a zoom lens assembly must be capable of performing at high speed and accelerations without incurring mechanical binding or excessive component wear. It is expected that a zoom lens assembly in a high volume photofinishing operation may experience upwards of 80 million actuations.

Typical lens assembly designs for high speed printers utilize cam and follower drive designs which are not particularly suited for high speed operation or extensive repetitive change. Cam and follower drives are expensive and susceptible to wear-related component failures.

Typical electromechanical lead screw drive systems are mechanically over-constrained, requiring expensive motor couplings and precise machining and alignments.

Other mechanical arrangements also suffer from the same deficiencies as cam and follower assemblies. Gears and belts are not suitable for high actuations in that they either wear out too quickly or are subject to frequent replacement.

It is highly desirable to provide an exactly constrained and accurate zoom lens assembly that is of low cost to manufacture, easy to assemble, and also is capable of long extended use for millions of actuations without component failure or maintenance.

SUMMARY OF THE INVENTION

In one aspect of the present invention there is provided a zoom lens apparatus comprising:

a pair of substantially parallel guide rods;

a first carriage slideably mounted to the pair of parallel guide rods;

a first lens element secured to the first carriage;

a first lead screw having a longitudinal axis, the first lead screw is mounted to the apparatus by a first bearing block assembly such that the longitudinal axis is substantially parallel to the pair of guide rods, the bearing block constraining the movement of the first lead screw along the longitudinal axis;

a first threaded drive coupling which is threadingly engaged to the first lead screw so that it can move along the axis of the first lead screw, the first threaded drive coupling is connected to the first carriage so as to move the first carriage along the pair of guide rods, the first threaded drive coupling providing substantially zero axial play;

a first motor having a drive shaft for driving the first lead screw, the shaft of the motor being connected to the first bearing block assembly and is mounted to the apparatus by a flex member;

a second carriage slideably mounted to the first pair of parallel guide rods;

a second lens element secured to the second carriage;

a second lead screw having a longitudinal axis, the second lead screw is mounted to the apparatus by a second bearing block assembly such that the longitudinal axis is substantially parallel to the pair of guide rods, the bearing block constraining the movement of the second lead screw along the longitudinal axis;

a second threaded drive coupling which is threadingly engaged to the second lead screw so that it can move along the axis of the second lead screw, the second threaded drive coupling is connected to the second carriage so as to move the second carriage along the pair of guide rods, the second threaded drive coupling providing substantially zero axial play; and a second motor having a drive shaft for driving the second lead screw, the shaft of the motor being connected to the second bearing block assembly and is mounted to the apparatus by a flex member.

In another aspect of the present invention there is provided a bearing block assembly for use in connecting two axially aligned shafts and constraining the shafts along the axis, the assembly comprising:

an annular mounting block having a opening, the opening having a first annular bore section of a first diameter and a second annular bore section of a second diameter, the first and second bore sections being substantially concentric with each other, the second diameter being greater than the first diameter;

a first radial bearing disposed within the first annular bore section and a second radial bearing disposed within the second annular bore section, the first and second radial bearings being secured within the opening; and a shaft coupling member having a flange member, the flange being disposed between the first and second radial bearings, a spring member is disposed between the flange and the first or second radial bearing so as to apply a separating force between the first and second radial bearings.

DETAILED DESCRIPTION OF THE INVENTION

Figure 1:
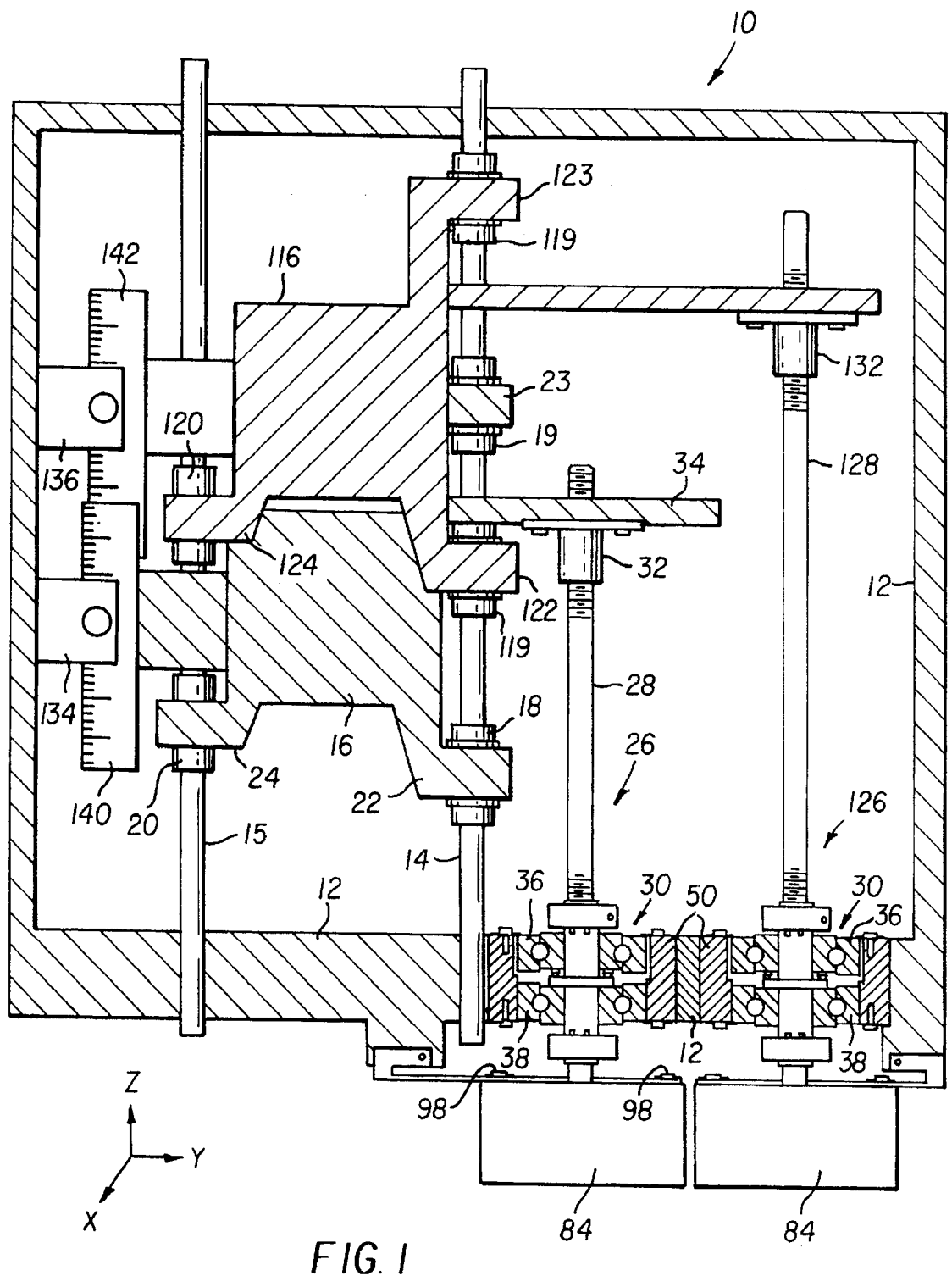
FIG. 1 is an elevational view partially broken away of a zoom lens assembly made in accordance with the present invention.
Figure 2:
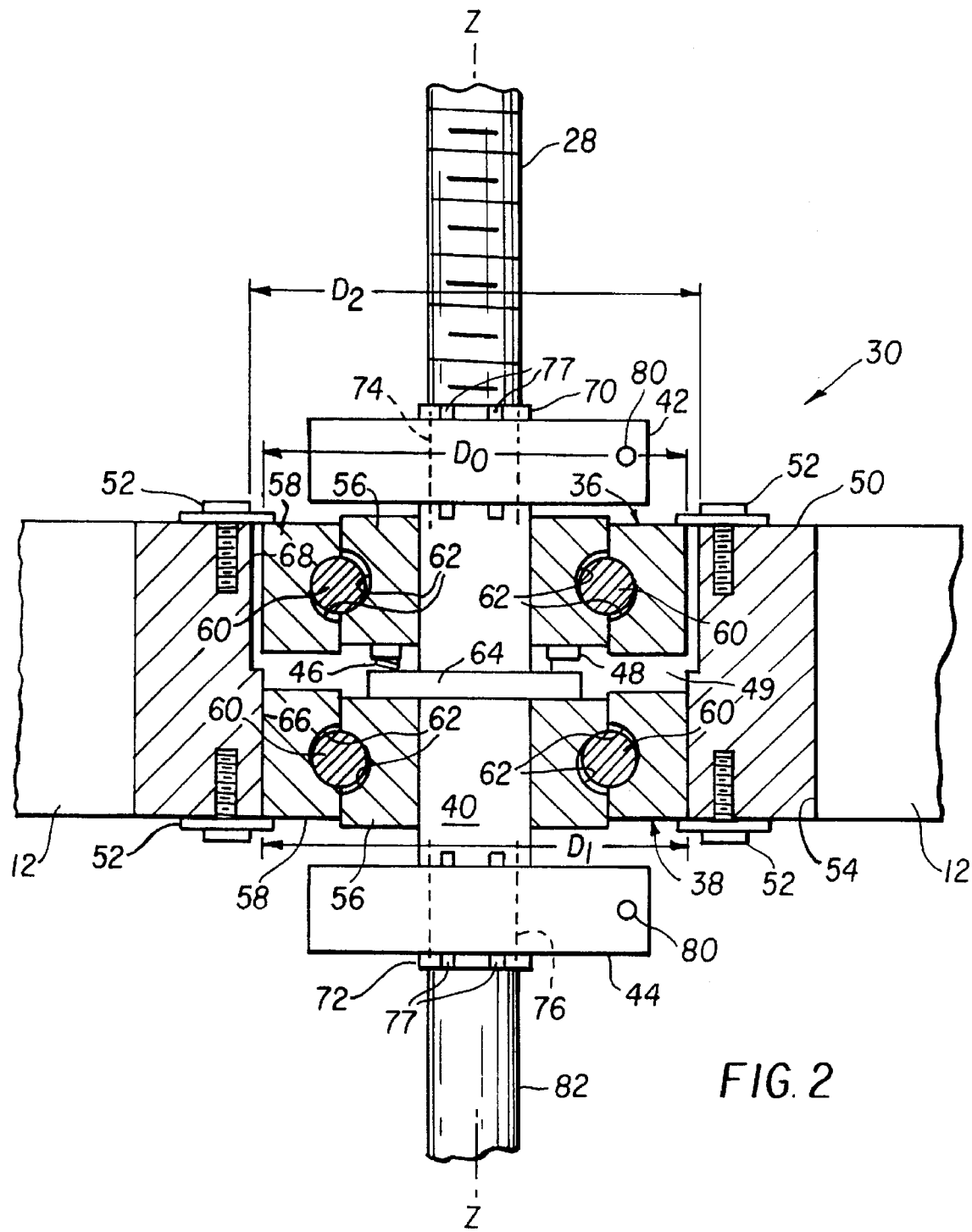
FIG. 2 is an enlarged partially broken away view of one of the bearing block assemblies used in the zoom lens assembly of FIG. 1.
Figure 3:
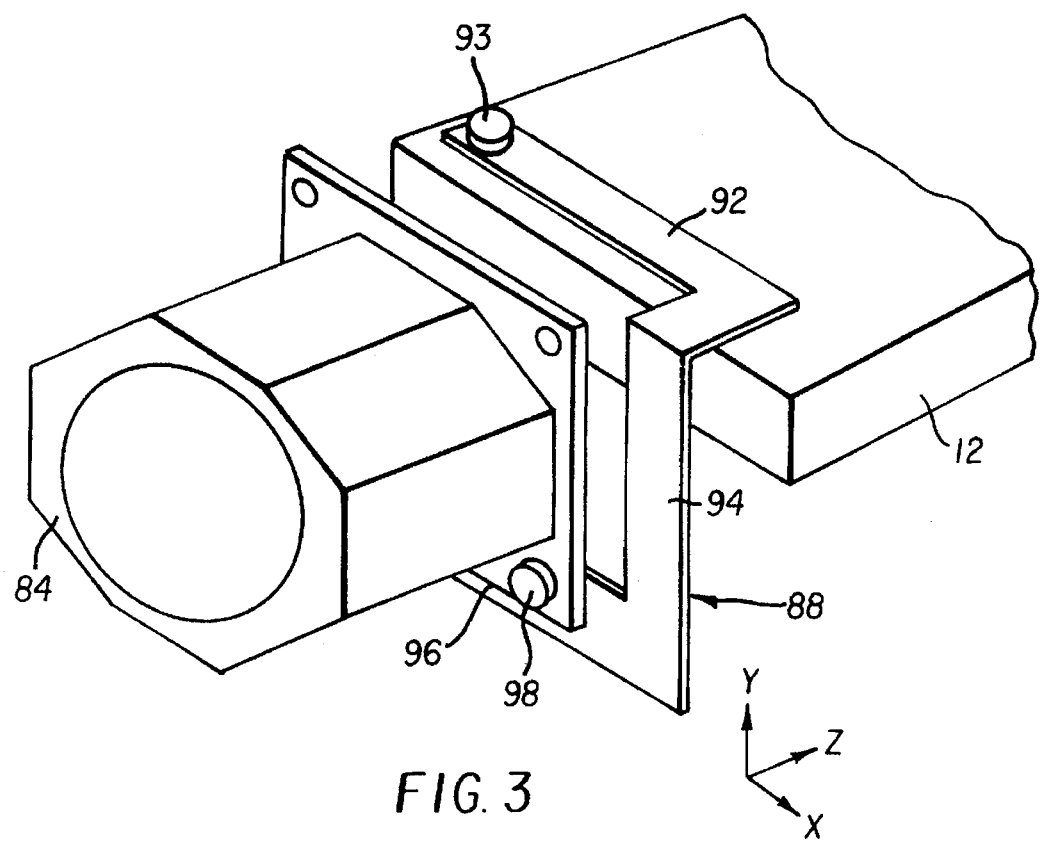
FIG. 3 is an enlarged view of one of the drive motors illustrated how it is mounted to the zoom lens assembly.

Referring to FIGS. 1–3, there is illustrated a zoom lens assembly 10 made in accordance with the present invention. The zoom lens assembly 10 is designed for use in a photofinishing apparatus, in particular, a high speed photographic printer wherein images taken from a film negative are printed onto a photosensitive paper. An example of a high speed printer for which a zoom lens assembly of the present invention could be use is the CLAS 35 printer, sold by the Eastman Kodak Company. Such a device is designed to print up to about eight images per second on photosensitive paper. A printer made in accordance with the present invention is also designed to accept images from various format size films and produce various format size prints therefrom (e.g., panoramic, standard, portrait, etc.), even if the print size format varies from image to image. Thus, it is extremely important to provide a device that is durable, yet provides the degree of accuracy necessary to provide high quality prints.

The zoom lens assembly 10 includes a pair of spaced substantially parallel guide rods 14,15. A first lens carriage 16 is slideably mounted to guide rods 14,15 by linear bearings 18,19,20. The lens carriage is designed to hold lens elements (not shown) for projecting of an image onto a photosensitive material. The linear bearings 18,19,20 are located in arm sections 22,23,24 on lens carriage 16. The linear bearings 18,19,20 allow the carriage to slide along the axis of the guide rods 14,15. For the sake of clarity in discussing the present invention, an x,y,z coordinate system is illustrated in the lower portion of FIG. 1. The linear bearings 18,19,20 provide five degrees of constraint to the lens carriage 16. In particular, it constrains the carriage 16 along the x and y axis, and constrains rotation about the x, y, and z axis. The bearing 20 is spring biased within arm section 24 such that bearing 20 is free to rotate in the θx direction so that it is connected to guide rod 15 and provides only one degree of constraint (i.e., rotation about z axis of guide rod 14). This type of constraint system allows for generous guide rod misalignment tolerances. The remaining single constraint to the lens carriage 16 is provided by the drive system 26. The drive system moves the lens carriage 16 along the z axis. The drive system includes a lead screw 28 having its lower end secured to a compliant bearing block assembly 30 which is secured to support frame 12. The upper end of the lead screw drives a drive nut 32, such that the nut 32 will move along the axis of the lead screw 28. The drive nut 32 is secured to drive member 34, which is secured to lens carriage 16. Thus, as the drive nut 32 moves along the axis of lead screw 28, this will cause the lens carriage 16 to move along the length of the guide rod 14 moving the lens carriage in the z direction. In the embodiment illustrated, the drive nut 32 is secured to drive member 34 by three screws 35, however, drive nut 32 may be secured to drive member 34 in any desired manner. The drive nut 32 is preferably a zero-backlash nut, which minimizes the backlash between the lens carriage and lead screw. A suitable zero-backlash nut may be purchased from Kerk Motion Products, Inc. of Hollis, N.H. A typical zero-backlash nut has a relative degree of compliance, and thus will allow freedom of the lead screw 28 in only two degrees of constraint, i.e., the angular movement about the x and y axis. This type of connection behaves substantially like a ball joint allowing the lead screw 28 to pivot within a conical volume.

Referring to FIG. 2, the compliant bearing block assembly 30 comprises a pair of radial bearings 36,38, a split shaft coupling 40, two clamping collars 42,44, a spring washer 46, a plain washer 48, mounting block 50, and retaining fasteners 52. The mounting block 50 is secured to support frame 12 by an appropriate fastener (not shown). However, mounting block 50 may be secured to support frame 12 by any desired manner. Each of the radial bearings 36,38 include an inner race 56 and an outer race 58, which are interconnected by a plurality of spherical balls 60 that are captured in substantially half hemispherical sections 62 provided in inner and outer races 56,58. The split shaft coupling 40 includes an annular flange 64, which is disposed between the inner races 56 of radial bearings 36,38. The spring washer 46 and flat washer 48 are placed adjacent to each other and are located between the flange 64 and one of the inner races 56. In the particular embodiment illustrated, the spring washer 46 and plain washer 48 are disposed between the flange 64 and adjacent inner race 56 of radial bearing 36. The spring 46 provides a force which tends to separate the inner races 56 of bearings 36,38. The mounting block 50 has an mounting opening 49 which comprises a first annular bore section 66 having a diameter D1 and an adjacent second annular bore section 68. The first and second bore sections being concentric. The bearing 38 is disposed within bore section 66 and bearing 38 is disposed within bore section 68. Preferably, as illustrated, diameter D1 is such that the outer diameter D0 of the outer race 58 of bearing 38 is in direct contact or press fit into the bore section 66. The second annular bore 68 has a diameter D2, which is greater than the diameter D1, such that the outer periphery of outer race 58 of radial bearing 36 is not constrained by the mounting block 50. The screws 52 maintain the bearings 36,38 within bore sections 66,68. The split shaft coupling 40 has a shaft diameter D3 which is less than the inside diameter D4 of the inner races 56. Since the outer diameter D0 of race 56 is less than the diameter D2 of second bore section 68, the race 36 is allowed to move freely along the axis z-x of the split shaft coupling 40 within the confines of bore section 68. The spring washer 46, as previously noted, provides an axial force separating which tends to separate radial bearings 36,38.

The split shaft coupling 40 has an upper section 70 and a lower section 72, each having an internal bore 74,76, respectively, (as illustrated by dash lines). The internal bores 74,76 are designed to receive the end of a shaft. In the particular embodiment illustrated, the internal bore 74 of upper section 70 is designed to receive the lower end 75 of lead screw 28. Clamping collar 42 is provided with means for clampingly holding the end 75 of lead screw 28 within internal bore 74. In the particular embodiment illustrated, this is accomplished by providing a plurality of slots 77 in upper section 70, which allows a screw (not shown) to be placed through opening 80 whereby, upon appropriate tightening, will cause the upper end 70 to clampingly engage the lower end 75 of lead screw 28. A similar locking arrangement is provided at the lower end 72, like numerals representing like parts and function. The lower end 72 is designed to receive drive shaft 82 of stepper motor 84. Shaft 82 provides the driving force to compliant bearing coupling assembly 30.

Referring to FIG. 3, the stepper motor 84 is mounted to support frame 12 by a mounting member 88. The mounting member 88 is designed to provide a flexure connection between the stepper motor 84 and frame support 12. In the particular embodiment illustrated, the flexure member 88 comprises a first leg member 92 having its furthest end secured to frame support 12 by a screw 93 (which extends in the x direction), a second flexible leg section 94 (which extends in the y direction) and a third mounting leg section 96 (which extends in the x direction) on which the stepper motor 84 is mounted by a pair of fasteners 98. However, it is to be understood that the stepper motor 84 may be mounted to the mounting section 96 by any desired means. The mounting bracket 88 is configured such that there is provided a certain degree of flexure such that the stepper motor is constrained in five degrees of constraints, i.e., rotation about the z axis. The shaft 82 of the stepper motor 84 is allowed to rotate about the z axis.

The zoom lens assembly 10 includes a second lens carriage 116. The lens carriage 116 is mounted to guide rods 14,15 in much the same manner as lens carriage 16 is mounted to guide rods 14,15. In particular, the lens carriage 116 is mounted through use of linear bearings 118,119,120 and moved along the guide rods 14,15. Likewise, lens carriage 116 includes arm sections 122,123,124 on which the linear bearings 118,119,120, respectively, are mounted. The arm portions 122,123,124 of carriage 116 and arm sections 22,23,24 of carriage 16 are shaped such that the carriages 16,116 do not come into contact with each other. However, if desired, separate guide rods for each lens carriage may be provided.

A drive system 126 is provided for driving drive nut 132 on lead screw 128. The drive system 126 is substantially identical to the drive system 26, like numerals indicating like parts and operation. In this embodiment, the lens carriage 116 is provided with lens elements (not shown), which align with lens elements (not shown) of lens carriage 116. The lens carriages 16,116 move along their respective guide rods such that the lens elements in each carriage are properly spaced so as to provide the appropriate magnification and format size required.

Referring to FIG. 1, there is provided means for recalibrating and checking the position of each of the carriages 16,116 with respect to the frame support 12. In particular, there is provided glass linear scales 140,142, one secured to each of the respective carriages 16,116. The scales each have markingd for identifying a vertical position with respect to the z axis. The linear sensors 134,136 are provided, one associated with each of the scales 140,142, respectively. The sensors 134,136 are used to provide information of the relative position of each of the carriages 16,116. This information is relayed to a central processing unit which is used to check and recalibrate the position of the carriages.

Figure 4:
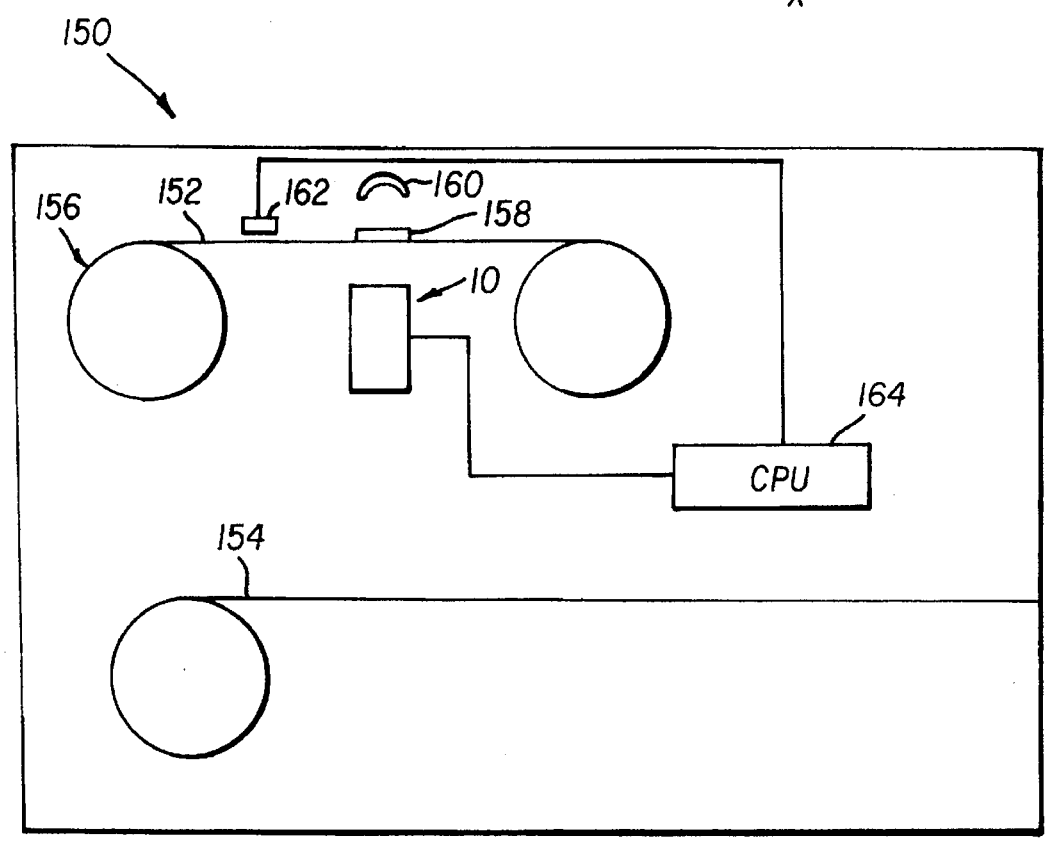
FIG. 4 is a schematic diagram of a photographic printer utilizing the zoom lens assembly of FIG. 1.

Referring to FIG. 4, there is illustrated in schematic form a photographic printer 150 employing a zoom lens assembly 10 made in accordance with the present invention. The photographic printer 150 is designed to print images developed on a photographic film 152, for example, 35 mm film, onto a photosensitive material 154 of a predetermined width, such as photographic sensitive paper. In particular, mechanism 156 is provided for supplying photographic film at a print gate 158 where upon light from light source 160 exposes the image thereon through zoom lens assembly 10 onto the photographic paper 154. The zoom lens assembly allows for the most efficient use of the predetermined width of the photosensitive material 154. Appropriate means are also provided for feeding of the photosensitive paper 154 in accordance with the images being exposed thereon from film 152 as is customarily done in the art. An appropriate sensor may be provided prior to exposure of film 152 at gate 158 so as to determine the format size of the image existing thereon. Therefore, depending upon the format size, the zoom lens assembly 10 will be appropriately adjusted to provide the appropriate format size onto the photosensitive material 154. Sensor 162 determines the particular format and relays this information to CPU 164, which then in turn independently controls the stepper motors 84 of zoom lens assembly 10. The stepper motors 84 are activated so as to properly position the carriages 16,116 to provide the appropriate magnification. Read head sensors 134,136 provide information to CPU 164 as to the position of the carriages 16,116 along the z axis. If the carriages 16,116 are properly positioned, no further action is necessary. However, if the read head sensors 134,136 indicate that the carriages 16,116 are not properly positioned, the stepper motors 84 will be appropriately activated until the carriages 16,116 are properly located. This information will be stored in the computer 164 for future movement of the carriages 16,116.

Thus, it can be seen that there is provided a zoom lens assembly that is relatively low in cost to manufacture, easy to assembly, provides accurate fast positioning of the lens and is also capable of long extended use for millions of actuations without component failure or maintenance.

It is to be understood that various other changes and modifications may be made without departing from the scope of the present invention. The present invention being defined by the following claims:

Parts List:

10 . . . zoom lens assembly
12 . . . support frame
14,15 . . . guide rods
16 . . . first lens carriage
18,19,20 . . . linear bearings
22,23,24 . . . arm sections
26 . . . drive system
28 . . . lead screw
30 . . . bearing block assembly
32 . . . drive nut
34 . . . drive member
35 . . . screws
36,38 . . . radial bearings
40 . . . split shaft coupling
42,44 . . . clamping collars
46 . . . spring washer
48 . . . plain washer
49 . . . mounting opening
50 . . . mounting block
52 . . . retaining fasteners
56 . . . inner race
58 . . . outer race
60 . . . spherical balls
62 . . . half hemispherical sections
64 . . . annular flange
66 . . . first annular bore section
68 . . . second annular bore section
70 . . . upper section
72 . . . lower section
74,76 . . . internal bore
75 . . . lower end
77 . . . slots
80 . . . opening
82 . . . drive shaft
84 . . . stepper motor
88 . . . mounting member
92 . . . first leg member 93 ... screw
94 ... second flexible leg section
96 ... third mounting leg section
98 ... fasteners
116 ... second lens carriage
118,119,120 ... linear bearings
122,123,124 ... arm sections
126 ... drive system
128 ... lead screw
132 ... drive nut
134,136 ... linear sensors
140,142 ... linear scales
150 ... photographic printer
152 ... photographic film
154 ... photosensitive material
156 ... mechanism
158 ... print gate
160 ... light source
162 ... sensor
164 ... CPU

We claim:

1. A zoom lens apparatus comprising:

a pair of substantially parallel guide rods;

a first carriage slideably mounted to said pair of parallel guide rods;

a first lens element secured to said first carriage;

a first lead screw having a longitudinal axis, said first lead screw being mounted to said apparatus by a first bearing block assembly such that said longitudinal axis is substantially parallel to said pair of guide rods, said first bearing block assembly constraining the movement of said first lead screw along said longitudinal axis;

a first threaded drive nut coupling which is threadingly engaged to said first lead screw for movement along the axis of said first lead screw, said first threaded drive nut coupling being connected to said first carriage so as to move said first carriage along said first pair of guide rods, said first threaded drive nut coupling providing substantially zero axial play;

a first motor having a drive shaft for driving said first lead screw, said drive shaft of said motor being connected to said first bearing block assembly and is mounted to said apparatus by a flex member;

a second carriage slideably mounted to said first pair of parallel guide rods;

a second lens element secured to said second carriage;

a second lead screw having a longitudinal axis, said second lead screw being mounted to said apparatus by a second bearing block assembly such that said longitudinal axis is substantially parallel to said pair of guide rods, said second bearing block assembly constraining the movement of said second lead screw along said longitudinal axis;

a second threaded drive nut coupling which is threadingly engaged to said second lead screw for movement along the axis of said second lead screw, said second threaded drive nut coupling being connected to said second carriage so as to move said second carriage along said first pair of guide rods, said second threaded drive nut coupling providing substantially zero axial play; and a second motor having a drive shaft for driving said second lead screw, said shaft of said motor being connected to said second bearing block assembly and is mounted to said apparatus by a flex member.

2. A zoom lens apparatus according to claim 1 further comprising a frame, said first and second bearing block assemblies being mounted to said frame.

3. A zoom lens apparatus according to claim 2 wherein said first and second bearing block assemblies each comprising;

an annular mounting block having a opening, said opening having a first annular bore section of a first diameter and a second annular bore section of a second diameter, said first and second bore section being substantially concentric with each other, said second diameter being greater than said first diameter;

a first radial bearing disposed within said first annular bore section and a second radial bearing disposed within said second annular bore section, said first and second radial bearings being secured within said opening; and a shaft coupling member having a flange member, said flange being disposed between said first and second radial bearings, a spring member is disposed between said flange and said first or second radial bearing so as to apply a separating force between said first and second radial bearings.

4. A zoom lens apparatus according to claim 3 wherein said shaft coupling member comprises an upper section and a lower section, said upper and lower sections each having an internal bore for receiving the end of a shaft.

5. A zoom lens apparatus according to claim 4, said upper section and said lower section having a plurality of slots which extend into said bore, said assembly further comprising a collar associated with said lower section and said upper section of said shaft coupling member and means for clamping said collar so as to clamp a shaft placed in said internal bore of said upper and lower sections.

6. A zoom lens apparatus according to claim 5 wherein said means for clamping comprises a screw which engages a threaded opening in said collar and where upon tightening will cause the associated upper or lower section to clamp the shaft in said internal bore.

7. A zoom lens apparatus according to claim 3 wherein said first and second bearings each comprise an inner race and an outer race.

8. A zoom lens apparatus according to claim 7 wherein said first bearing is securely positioned within said first annular bore section, said second bearing having an outer diameter less than said second diameter of said second annular bores such that said second bearing is not constrained by the sides of said second annular bore section.

9. A zoom lens apparatus according to claim 1 further comprising means for recalibrating the position of the carriages, said means comprises a linear scale secured to each of the carriages, a stationary sensor for reading each of said scales, and a CPU for controlling the movement of said motors such that the position of said carriages is properly adjusted.

10. A bearing block assembly for use in connecting two axially aligned shafts and constraining the shafts along the axis, said assembly comprising;

an annular mounting block having a opening, said opening having a first annular bore section of a first diameter and a second annular bore section of a second diameter, said first and second bore sections being substantially concentric with each other, said second diameter being greater than said first diameter;

a first radial bearing disposed within said first annular bore section and a second radial bearing disposed within said second annular bore section, said first and second radial bearings being secured within said opening; and a shaft coupling member having a flange member, said flange being disposed between said first and second radial bearings, a spring member is disposed between said flange and said first or second radial bearing so as to apply a separating force between said first and second radial bearings.

11. A bearing block assembly according to claim 10 wherein said shaft coupling member comprises an upper section and a lower section, said upper and lower sections each having an internal bore for receiving the end of a shaft.

12. A bearing block assembly according to claim 11, said upper section and said lower section having a plurality of slots which extend into said bore, said assembly further comprising a collar associated with said lower section and said upper section of said shaft coupling member and means for clamping said collar so as to clamp a shaft placed in said internal bore of said upper and lower sections.

13. A bearing block assembly according to claim 12 wherein said means for clamping comprises a screw which engages a threaded opening in said collar and where upon tightening will cause the associated upper or lower section to clamp the shaft in said internal bore.

14. A bearing block assembly according to claim 10 wherein said first and second bearings each comprise an inner race and an outer race.

15. A bearing block assembly according to claim 14 wherein said first bearing is securely positioned within said first annular bore section, said second bearing having an outer diameter less than said second diameter of said second annular bores such that said second bearing is not constrained by the sides of said second annular bore section.

* * * * *